US010277664B2

(12) United States Patent
Cradick et al.

(10) Patent No.: US 10,277,664 B2
(45) Date of Patent: *Apr. 30, 2019

(54) DISPLAYING AN APPLICATION IN A WINDOW IN A GRAPHICAL USER INTERFACE ENVIRONMENT ON A COMPUTER SYSTEM

(71) Applicant: International Business Machines Corporation, Armonk, NY (US)

(72) Inventors: Ryan K. Cradick, Oronoco, MN (US); Andrew L. Frenkiel, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/292,358

(22) Filed: May 30, 2014

(65) Prior Publication Data

US 2015/0180943 A1 Jun. 25, 2015

Related U.S. Application Data

(63) Continuation of application No. 14/140,079, filed on Dec. 24, 2013.

(51) Int. Cl.
*H04L 29/08* (2006.01)
*G06F 3/01* (2006.01)
(Continued)

(52) U.S. Cl.
CPC ............. *H04L 67/10* (2013.01); *G06F 3/016* (2013.01); *G06F 3/0481* (2013.01); *G06F 3/167* (2013.01)

(58) Field of Classification Search
CPC .......... G06F 3/0482; G06F 3/167; G06F 3/16; H04L 67/10
See application file for complete search history.

(56) References Cited

U.S. PATENT DOCUMENTS 5,826,051 A  10/1998  Porter et al.
5,835,088 A  11/1998  Jaaskelainen, Jr.
(Continued)

FOREIGN PATENT DOCUMENTS

EP   1418498 A2   5/2004
EP   1655664 A2   5/2006
(Continued)

OTHER PUBLICATIONS

Brink, Processor Priority Level-Set for Processes in Windows 8, Brink, 6 pages.*

(Continued)

*Primary Examiner* — Ryan F Pitaro
*Assistant Examiner* — Parmanand D Patel
(74) *Attorney, Agent, or Firm* — Nolan M. Lawrence

(57) ABSTRACT

Focus requests to display applications are received, each focus request associated with at least one application from the applications. Application context from metadata tags describing content of the application is received. User context associated with information about a status of a user interacting with the computer system is received. Display priority of the applications based on the application context and the user context is determined. A list of the applications based on the display priority is created. The applications are displayed in windows in the graphical user interface environment based on the list.

3 Claims, 5 Drawing Sheets

(51) Int. Cl.
*G06F 3/0482* (2013.01)
*G06F 3/16* (2006.01)
*G06F 3/0481* (2013.01)

(56) References Cited

U.S. PATENT DOCUMENTS

| | | | |
|---|---|---|---|
| 5,889,517 | A | 3/1999 | Ueda et al. |
| 7,356,775 | B2 | 4/2008 | Ruelle et al. |
| 7,865,839 | B2 | 1/2011 | Heikes et al. |
| 8,392,992 | B1 | 3/2013 | Spertus |
| 2004/0095401 | A1 | 5/2004 | Tomimori |
| 2005/0198589 | A1* | 9/2005 | Heikes ............... H04L 51/04 715/805 |
| 2006/0005142 | A1* | 1/2006 | Karstens ............ G06F 3/0481 715/767 |
| 2006/0090169 | A1* | 4/2006 | Daniels .............. G06F 3/0481 719/320 |
| 2006/0192775 | A1* | 8/2006 | Nicholson ............ A61F 4/00 345/211 |
| 2007/0214426 | A1* | 9/2007 | Ruelle ................ G06F 3/0481 715/767 |
| 2007/0261005 | A1* | 11/2007 | Kreiner ............... G06F 9/451 715/830 |
| 2010/0058230 | A1 | 3/2010 | Shing |
| 2011/0283226 | A1 | 11/2011 | Basson et al. |
| 2012/0047509 | A1* | 2/2012 | Ben-Itzhak .......... G06F 9/4881 718/103 |
| 2013/0073986 | A1 | 3/2013 | Heikes et al. |
| 2013/0290058 | A1* | 10/2013 | Gray ................. G06Q 10/1095 705/7.19 |

FOREIGN PATENT DOCUMENTS

| | | |
|---|---|---|
| EP | 1655664 A3 | 11/2007 |
| WO | 2006043018 A2 | 4/2006 |

OTHER PUBLICATIONS

Brink, Processor Priority Level—Set for Processes in Window 8, Nov. 21, 2016, 6 pages (Year: 2016).*

"Applications Stealing Focus—reg key no longer fixes", Microsoft Community Forum, © 2013 Microsoft. http://answers.microsoft.com/en-us/windows/forum/windows_7-windows_programs/applications-stealing-focus-reg-key-no-longer/4ee5be7d-31ef-493b-b092-f6f6139f99cd, date printed: Sep. 11, 2013.

Baldwin et al., "Perceived urgency mapping across modalities within a driving context", Applied Ergonomics, © 2013 Elsevier Ltd and the Ergonomics Society. Abstract Only. Copyright.

"Focus Stealing", Wikipedia the Free Encyclopedia, http://en.wikipedia.org/wiki/Focus_stealing, date printed: Sep. 11, 2013.

Kilpatrick et al., "Securing the X Window System with SELinux", NAI Labs Report # 03-006, NAI Labs, pp. 1-33, Last revised Mar. 2003.

Massey et al., "XCB: An X Protocol C Binding", Proceedings of the XFree86 Technical Conference, USENIX Association, 2001.

Scheifler, R., "X Window System Protocol, Version 11, Alpha Update, Apr. 1987" Network Working Group, Jun. 1987, Copyright © 1986, 1987 Massachusetts Institute of Technology.

"Stealing Focus", Microsoft and Windows Vista Community Forums, Vistaheads, © 2000-2013, Jelsoft Enterprises Ltd. http://www.vistaheads.com/forums/microsoft-public-windows-vista-administration-accounts-passwords/52293-stealing-focus.html, date printed: Sep. 11, 2013.

"Prioritise X applications with focus", UNIX & Linux Questions, StackExchange, © 2013 stack exchange inc. http://unix.stackexchange.com/questions/31831/prioritise-x-applications-with-focus.

Cradick et al., "Displaying an Application in a Window in a Graphical User Interface Environment on a Computer System", U.S. Appl. No. 14/140,079, filed Dec. 24, 2013.

* cited by examiner

DISPLAYING AN APPLICATION IN A WINDOW IN A GRAPHICAL USER INTERFACE ENVIRONMENT ON A COMPUTER SYSTEM

BACKGROUND

The present invention relates generally to computer systems, and more particularly to an enhanced graphical user interface. One advance in the computing arts has been the introduction of the graphical user interface (GUI). A GUI enables a user to enter data and commands and to execute programs by means of a keyboard and a computer mouse. In addition, a GUI enables a user to display information, generated by many types of programs, on a computer screen in a variety of formats, depending upon the needs of the user. Conventional GUIs allow many windows to be concurrently opened and share the same computer display screen. Using the GUI, the user controls the size and arrangement of these windows, which are typically stacked one on top of the other on the screen.

SUMMARY

Disclosed herein are embodiments of a method of displaying an application in a window in a graphical user interface environment included on a computer system. In various embodiments, the method may include receiving one or more focus requests to display one or more applications, each focus request associated with at least one application from the one or more applications. The method may also include receiving an application context from at least one metadata tag describing content of the at least one application. In addition, the method may include receiving a user context associated with information about a status of a user interacting with the computer system. Also, the method may include determining display priority of the one or more applications based on the application context and the user context. The method may also include creating a list of the one or more applications based on the display priority. Furthermore, the method may include displaying the one or more applications in one or more windows in the graphical user interface environment based on the list.

Also disclosed herein are embodiments of a system of displaying an application in a window in a graphical user interface environment included on a computer system. In various embodiments, the system may include a context manager configured to receive one or more focus requests to display one or more applications, each focus request associated with at least one application from the one or more applications. The context manager may be further configured to receive application context from at least one metadata tag describing content of the at least one application. The context manager may also be configured to receive a user context associated with information about a status of a user interacting with the computer system. In addition, the system may include a priority manager configured to determine a display priority of the one or more applications based on the application context and the user context. The priority manager may also be configured to create a list of the one or more applications based on the display priority. Furthermore, the system may also include a scheduler configured to display the one or more applications in one or more windows in the graphical user interface environment based on the list.

Also disclosed herein are embodiments of a computer program product for displaying an application in a window in a graphical user interface environment included on a computer system. In various embodiments, the computer program product may be configured to receive one or more focus requests to display one or more applications, each focus request associated with at least one application from the one or more applications. The computer program product may also be configured to receive an application context from at least one metadata tag describing content of the at least one application. In addition, the computer program product may be configured to receive a user context associated with information about a status of a user interacting with the computer system. Also, the computer program product may be configured to determine a display priority of the one or more applications based on the application context and the user context. The computer program product may also be configured to create a list of the one or more applications based on the display priority. Furthermore, the computer program product may be configured to display the one or more applications in one or more windows in the graphical user interface environment based on the list.

DETAILED DESCRIPTION

Figure 1:
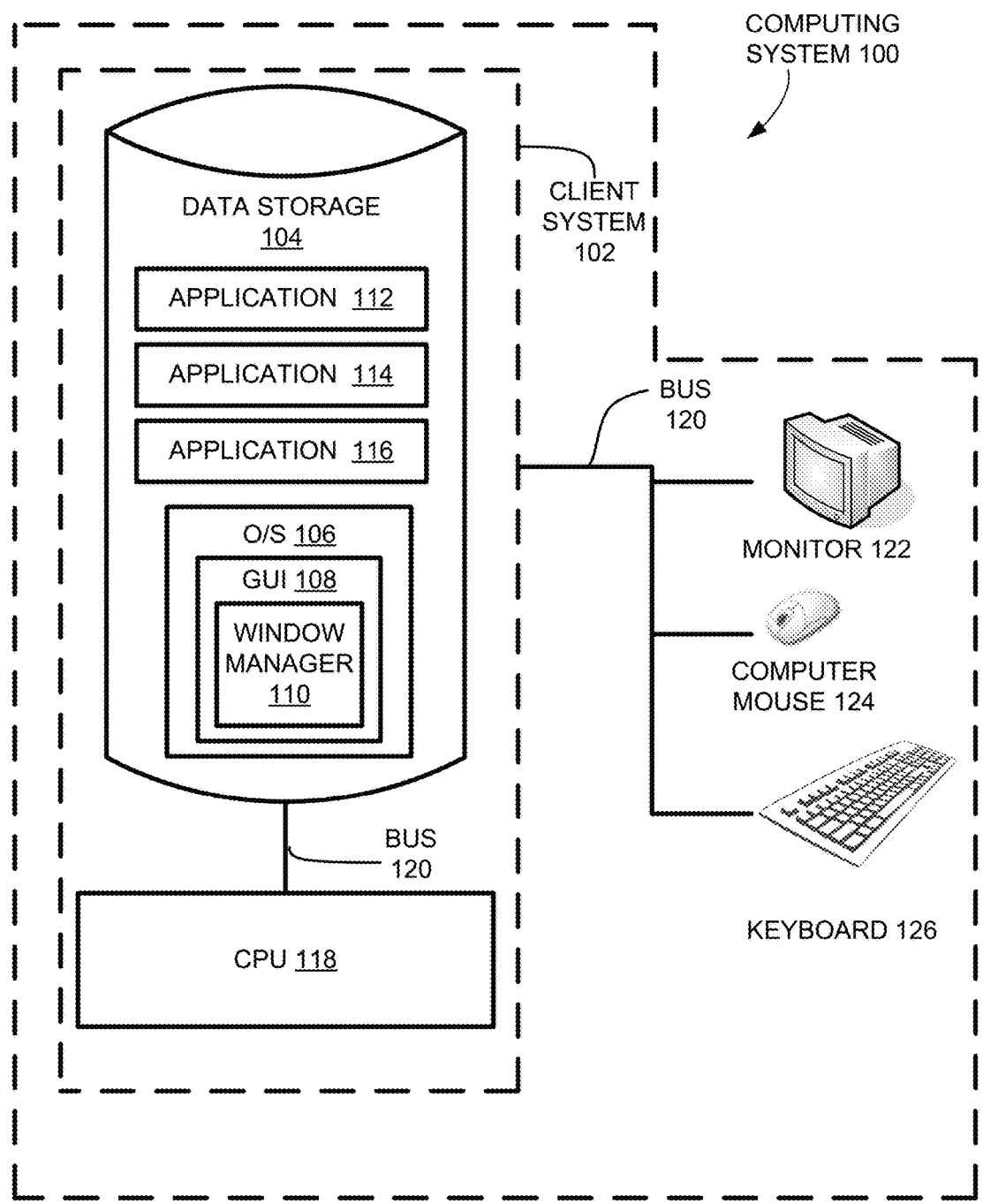
FIG. 1 depicts a block diagram of an example computing system that incorporates the claimed subject matter, consistent with embodiments of the present disclosure.

Many conventional operating systems, such as the Windows™, OS/2™, and AIX™ operating systems, utilize graphical user interface (GUI) desktop environments to organize computer applications. To display an application in a window, conventional GUIs may examine an identifier (e.g., name) of an application and search a resource file for the identifier. The resource file contains information about each window, such as any initial value, the default color of the window, the default size of the window, and the window's location on the display screen. When a window receives focus, the GUI transfers input information, such as key strokes from a keyboard, to the application running in that window.

Applications in windows may be open at the same time and the GUI may display the windows stacked on top of one another, in a default size and location on the display screen. When the user single clicks over a window not positioned on top of the stack of windows, the GUI transfers focus from the window on the top of the stack to the new window. Also, an O/S may direct the GUI to transfer focus from a window that is currently displayed, to another window that has just opened. When a window receives focus, the GUI places that window on top of the stack of windows and, as previously mentioned, queues any key strokes by the user from a keyboard to the application running in that window.

Several disadvantages and limitations arise when several windows of applications are initiated on a conventional GUI. For example, multiple applications are often initiated during a start-up of a system and may require user authentication or acknowledgment. The user may be entering information into a first window at this time and a second window from the applications that have just been initiated may steal the focus from the first window, causing the user to enter the information into the wrong, second window. Furthermore, applications such as update utilities, security applications, and notification systems, often need immediate attention. The windows for these applications may also steal the focus from a first window, causing the user to input information into the wrong window. Given the heterogeneous mix of applications used by many users, focus stealing continues to be a source of considerable frustration.

The present disclosure relates to a windowing system with several interrelated methods to manage multiple competing requests for application focus based on the system context. Furthermore, the windowing system may select the application to have focus by prioritizing focus requests based on a combination of the context of the application, the status of the user interacting with the system, and learned or configured preferences.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present disclosure may take the form of a computer program product embodied in a tangible medium of expression having computer usable program code embodied in the medium.

Various combinations of one or more computer usable or computer readable medium(s) may be utilized. The computer-usable or computer-readable medium may be, for example, an electronic, magnetic, optical, electromagnetic, infrared, or semiconductor system, apparatus, device, or other propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be a medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using an appropriate medium, including but not limited to wireless, wireline, optical fiber cable, RF, etc.

Computer program code for carrying out operations of the present disclosure may be written in various combinations of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through various types of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to the figures, FIG. 1 depicts a block diagram of an example computing system 100 that incorporates the claimed subject matter, consistent with embodiments of the present disclosure. The computing system 100 may include a client system 102 coupled via a bus 120 to a monitor 122, a computer mouse 124, and a keyboard 126, which together may facilitate human interaction with client system 102. Furthermore data storage component 104 and CPU 118 may be coupled via a bus 120 and included in client system 102.

Illustratively, data storage component 104 may contain an operating system (O/S) 106 and several applications, i.e. application 112, application 114, and application 116. It should be noted that the disclosed technology applies to many types of applications, but for sake of simplicity only application 112, application 114, and application 116 are illustrated. O/S 106 may be a collection of software that manages computer hardware resources and may provide common services for computer applications, i.e. application 112, application 114, and application 116. Examples of common O/S's are Linux, Microsoft Windows, IBM z/OS, etc., however, any operating system may be used.

O/S 106 may include a graphical user interface (GUI) 108, as shown in FIG. 1. Incorporating GUI 108 into O/S 106 may allow GUI 108 to reduce the number of context switches required for GUI 108 to perform its functions. However, GUI 108 may also be allocated outside O/S 106 similar to other applications, i.e. application 112, application 114, and application 116.

GUI 108 may use a combination of technologies and devices to present a platform that a user may interact with through the use of electronic components, i.e. monitor 122, computer mouse 124, and keyboard 126. A common platform presented by a GUI, i.e., GUI 108, is a window, icon, menu, pointing device (WIMP) platform. The WIMP platform may use an input device, i.e., computer mouse 124, to control the position of a pointer and present information organized in windows through a display, i.e., monitor 122.

Illustratively, GUI 108 is shown to include window manager 110. A window manager, i.e. window manager 110, may be software that controls the placement and appearance of windows in a WIMP platform presented by a GUI, i.e., GUI 108. A window manager, i.e., window manager 110, may work in conjunction with a GUI, i.e., GUI 108, to help facilitate visual aspects and functionality of a WIMP platform. Some visual aspects that a window manager, i.e., window manager 110, may facilitate may be borders on windows, desktop wallpaper, virtual desktop, etc. Some functionality features that a window manager, i.e., window manager 110, may facilitate include task switching, tabbed windows, focus stealing, etc. Focus stealing allows an application not in focus to suddenly gain focus and receive input information, such as key strokes from a keyboard, i.e., keyboard 126.

Figure 2:
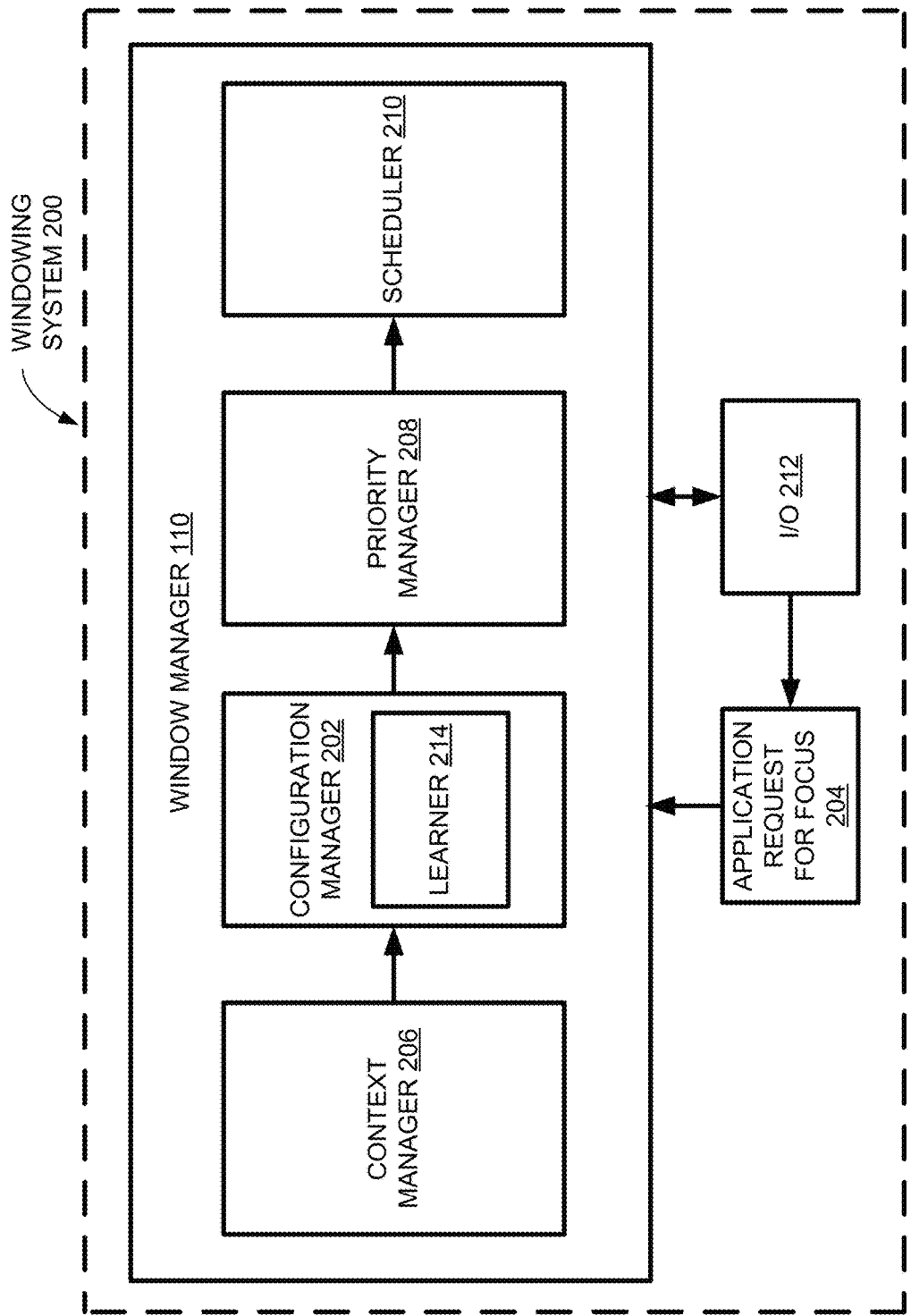
FIG. 2 depicts an example windowing system, consistent with embodiments of the present disclosure.

FIG. 2 depicts a windowing system 200, consistent with embodiments of the present disclosure. The windowing system 200 is shown to include window manager 110, an application request for focus 204, and an I/O device 212. The application request for focus 204 may come from a number of sources. For instance, a user may make an application request for focus 204 using an I/O device 212 such as a computer mouse, i.e., computer mouse 124, a keyboard, i.e., keyboard 126, a touch screen (not shown), etc. In some embodiments, an application, i.e., application 112, may make an application request for focus 204 for another application, i.e., application 114. In some embodiments, an O/S, i.e., O/S 106, may make an application request for focus 204 for an application, i.e., application 112. Furthermore, an application request for focus 204 may be made at several different times. For instance, an O/S, i.e., O/S 106, may make an application request for focus 204 for an application, i.e., application 112, during the start-up of a computer system, i.e., computing system 100. In another embodiment a user may make an application request for focus 204 for an application, i.e., application 112, periodically throughout the day.

Illustratively, window manager 110 is shown to include a configuration manager 202, a context manager 206, a priority manager 208, and a scheduler 210. Configuration manager 202 may manage the configuration information related to user preferences for focus stealing. Preference may also be manually configured or learned. For example, a user may configure priorities for specific applications, preferences for mode of alerting a user that an application is scheduled for display, inter-arrival delay, etc. Furthermore, configuration manager 202 may set default preferences based on pre-configured rules. For example, a request for focus 204 for an alert message may not steal focus from an application that has focus and is prompting the user for authentication.

The configured preference may be encoded as a set of key-value pairs or rules. A key-value pair may be a set of linked data items. The key may identify data and the value may be the data identified by the key, a pointer to the location of the data, etc. In various embodiments, an application, i.e. application 112, may have focus and may be a prompt asking the user if they would like to update a virus protection software. A request for focus 204 may be made for an application, i.e., application 114, that is a reminder that a meeting starts in an hour. Configuration manager 202 may have a preference rule that is encoded to not allow a reminder for a meeting to steal focus from another application if the meeting does not start in less than 20 minutes.

An application request for focus 204 may prompt context manager 206 to observe the system context of the application request for focus 204. As stated herein, the windowing manager 110 may manage multiple competing requests for application focus based on the system context. The system context may comprise the content of an application and the status of a user. The content of an application may be referred to as application context and the status of a user may be referred to as user context. Application context may dictate the importance of an application stealing focus from another application. The application context may be inferred from metadata tags provided by the application and associated with the application request for focus 204. In software applications, a metadata tag may be a keyword or term assigned to a piece of an information artifact such as an application. This kind of metadata may add additional value to the information artifact, may help to describe the information artifact, and may be capable of adding features to an information artifact. Context manager 206 may parse the metadata tags from the application that has a request for focus 204.

In some embodiments, the application context may be inferred from the metadata tags that describe the content that is to be displayed by an application. For example, application 112 may be an email login request and application 114 may be a calendar alert for a meeting that starts in an hour. Concurrent application requests for focus 204 may be made for application 112 and application 114. Context manager 206 may parse the metadata tags that describe the content of application 112 and application 114 and transfer this information to configuration manager 202. Configuration manager 202 may then compare the application context of application 112 and application 114 against the preferences and transfer this information to priority manager 208.

Consistent with various embodiments, priority manager 208 may determine priority to the application request for focus 204. The system context comprising the application context and the user context, in concert with the preferences, may be used to determine priority. In an embodiment, priority manager 208 may prioritize the more important application request for focus 204. Continuing with the example, priority manager 208 may determine that application 112, the email login request, may be more important than application 114, the calendar alert for a meeting. Priority manager 208 may then prioritize the application request for focus 204 for application 112 higher than the application request for focus 204 for application 114.

Much like the application context, the user context may also dictate the importance of an application stealing focus from another application. For example, application 112 may be a word processor and application 114 may be media player. The user may be typing into a text document of application 112 and looking down at keyboard 126 when an application request for focus 204 is made for updating application 114. Context manager 206 may receive the user context when the request for focus 204 is made for updating application 114 and context manager 206 may transfer this information to configuration manager 202. Configuration manager 202 may then compare the application context of application 112 and application 114 against the preferences and transfer this information to priority manager 208. Furthermore, because the user is looking down at the keyboard, configuration manager 202 may compare the user context against the preferences and transfer this information to priority manager 208 as well.

Priority manager 208 may determine that both application 112 and application 114 have the same level of priority. However, priority manager 208 may also determine, because the user is looking down at keyboard 126, that the user may not recognize that an update for application 114 may steal focus from the text document of application 112. Therefore, priority manager 208 may prioritize the current application request for focus 204 for the text document of application 112, higher than the application request for focus 204 for updating application 114.

In various embodiments, priority manager 208 may also manage a priority list of application requests for focus 204. The list may also be managed according to the system context comprising the application context and the user context, in concert with the preferences. Furthermore, when an application is displayed to a user, priority manager 208 may remove the application request for focus 204 from the list. For example, application 112, application 114, and application 116 may make up a priority list of application requests for focus 204. Application request for focus 204 for application 112 may have the highest priority. When application 112 is displayed to a user, application request for focus 204 for application 112 may be removed from the priority list, leaving only an application request for focus 204 for application 114 and application 116. In another embodiment, there may be a minimum system context value and priority manager 208 may ignore an application request if it does not meet the minimum value.

Illustratively, the priorities of the application requests for focus 204 or the priority list of the application requests for focus 204 may be transferred to scheduler 210. Scheduler 210 may schedule the display of the applications and if there are multiple application requests for focus 204 that have the same priority, scheduler 210 may present a dialog enabling a user to select which applications may be displayed.

Furthermore, scheduler 210 may select an appropriate mode to alert a user that an application is scheduled for display based upon the system context comprising the application context and the user context, in concert with the preferences. Possible types of notifications may be an audible signal, heptic feedback from a computer mouse, i.e., computer mouse 124, or a keyboard, i.e., keyboard 126, wiggling an application in a toolbar, displaying a dialog with a disabled input text area in the background, etc. For example, application 112 may be a window for entering text. A request for focus 204 of application 114 may be made. Scheduler 210 may select a mode of alerting the user that application 114 is scheduled for display that avoids disrupting the on going activity of entering text into application 112, such as an audio alert. Additionally, if a system, i.e., computing system 100, is playing music when an application is scheduled for display, a visual alert may be used. Conversely, if the user is not looking at a screen, i.e., monitor 122, and music is playing, a heptic feedback alert may be appropriate.

An application may be displayed to a user via I/O device 212, i.e., monitor 122, at the time scheduled by the scheduler 210. Priority manager 208 may then observe that the application has been displayed and remove the request from the priority list.

Consistent with certain embodiments, configuration manager 202 is shown to include a learner 214. Learner 214 may receive the response of a user to a display of an application and may generate a set of updates to the preferences based upon the response of the user. As illustrated, I/O device 212 may be in communication with window manager 110. Learner 202 may receive the response of a user and a computing system, i.e., computing system 100, from the interaction between the user and I/O device 212, i.e., computer mouse 124, keyboard 126, a camera (not shown). Learner 202 may then update preferences based on the response of the user to the display of the application. Also, learner 202 may include an application (not shown) that may allow the user to specify whether an application, i.e., application 114, stealing focus from another application, i.e., application 112, was appropriate. The application may also allow the user to specify whether an application, i.e., application 114, not stealing focus from another application, i.e., application 112, was appropriate.

For example, configuration manager 202 may have a preference rule that is encoded to steal focus from another application whenever a multi-media application needs to be updated. Application 112 may be a prompt to the user to enter authentication to sign into email. Application 114 may be a prompt asking the user if they would like to update a music software. Upon start-up of computing system 100, the user may be entering authentication into application 112 when an application request 204 is made for application 114. Application 114 may steal focus from application 112. However, the user may respond by stealing the focus from application 114 and place focus back on application 112 by using computer mouse 124 to click on the window of application 112 and entering authentication into application 112 using keyboard 126. Upon receiving the response of the user, learner 212 may update the preference rule that is encoded to steal focus from another application whenever a multi-media application needs to be updated to not let a multi-media application update steal focus from an email application that is prompting the user to enter authentication. In certain embodiments, learner 212 may decrease a confidence of the preference rule that is encoded to steal focus from another application whenever a multi-media application needs to be updated. In further embodiments, the user may not steal focus from application 114 and place focus back on application 112. Learn 212 may then increase the confidence of the preference rule.

In an alternate example, learner 212 may have an application (not shown) that opens after application 114 steals focus from application 112. The application may ask the user whether application 114 stealing focus from application 112 was appropriate, potentially due to a low confidence level. The user may then answer and learner 212 may update the preference rule that is encoded, increase confidence level, or decrease confidence level based upon the user's answer.

Figure 3:
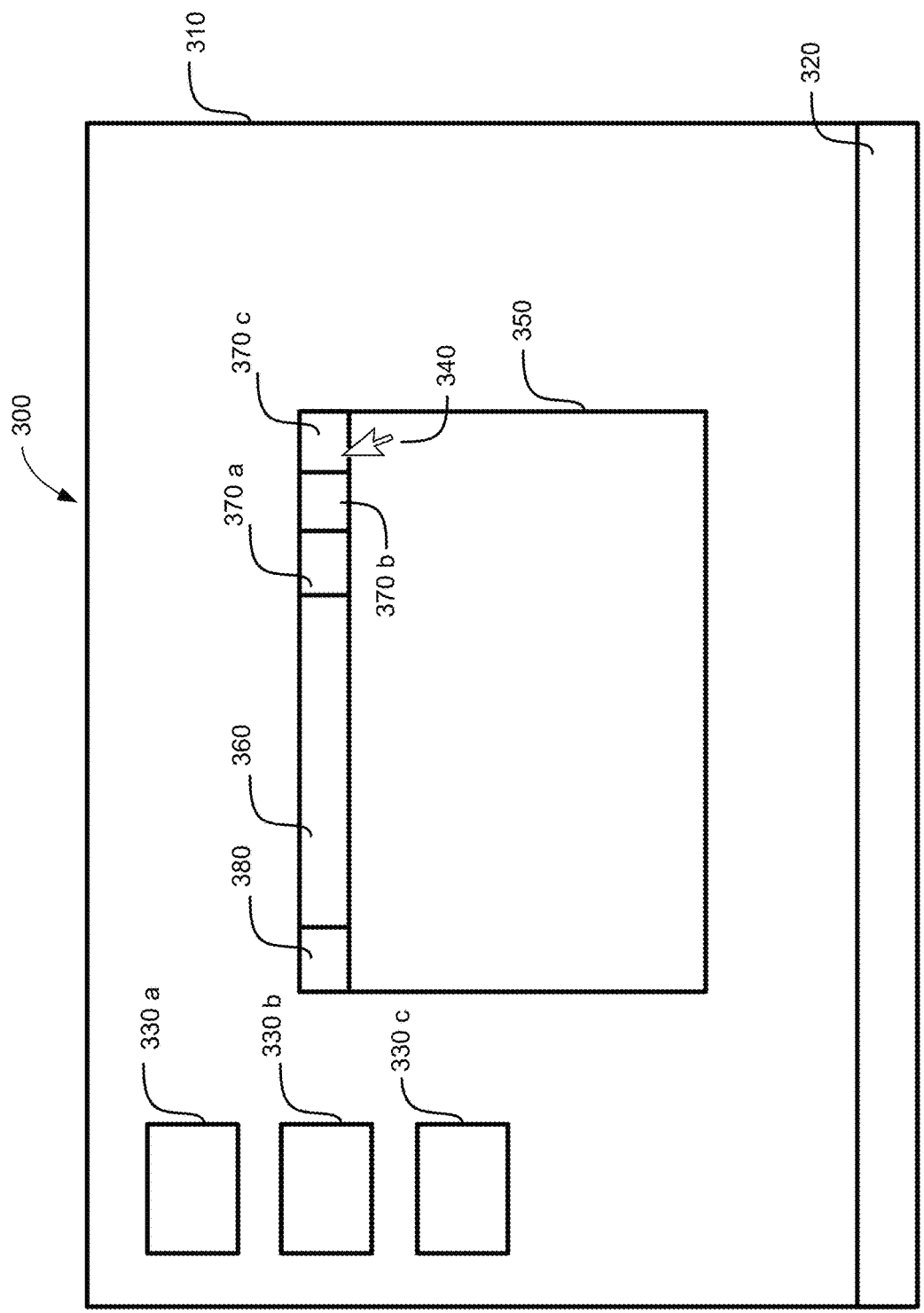
FIG. 3 depicts an example graphical user interface environment including an application in an open window, consistent with embodiments of the present disclosure.

FIG. 3 depicts a graphical user interface environment 300 including an application in an open window, consistent with embodiments of the present disclosure. The graphical user interface environment comprises desktop 310, on which are displayed taskbar 320 and icons 330 *a*, 330 *b* and 330 *c*. Icons 330 *a*, 330 *b* and 330 *c* represent selectable software items, for example, applications or data folders. An iconic representation of an application may appear on the taskbar when an instance of the application is opened in a window. Graphical cursor 340 is freely moveable on desktop 310 using a cursor movement device such as a computer mouse, i.e., computer mouse 124, a trackball, a trackpad or a joystick. It is understood that other arrangements of a graphical user interface environment are possible without departing from the invention.

A request for focus for an application may be received. The application request for focus may come from a number of sources. For instance, a user may make an application request for focus using an I/O device such as a computer mouse, i.e., computer mouse 124, a keyboard, i.e., keyboard 126, a touch screen (not shown), etc. A user may make a request for focus of an application by using an I/O device to control cursor 340 to select an icon, i.e., icons 330 *a*, 330 *b*, or 330 *c*. When an icon is selected, the application may be displayed in window 350 on desktop 310. Window 350 comprises, in addition to the window contents, title bar 360. At the left of title bar 360 is window menu selection button 380. Selection of this button causes display of a drop down menu of available selection operations. At the right of title bar 360 are, respectively, MINIMIZE button 370 *a*, MAXIMIZE button 370 *b* and CLOSE button 370 *c*. The selection of these buttons causes, respectively, the minimization of window 350, the maximization of the window 350, and the closure of the window 350.

When an icon is selected, a request for focus is made. Windowing system 200 may use several inter-related methods to manage the scheduling and displaying of the application. The scheduling and displaying of the application may be based on the system context that is comprised of application context and user context. Furthermore, when the application is displayed, as depicted in FIG. 3 by the display of window 350, the application request for focus may be removed from a priority list of applications requesting focus.

Figure 4A:
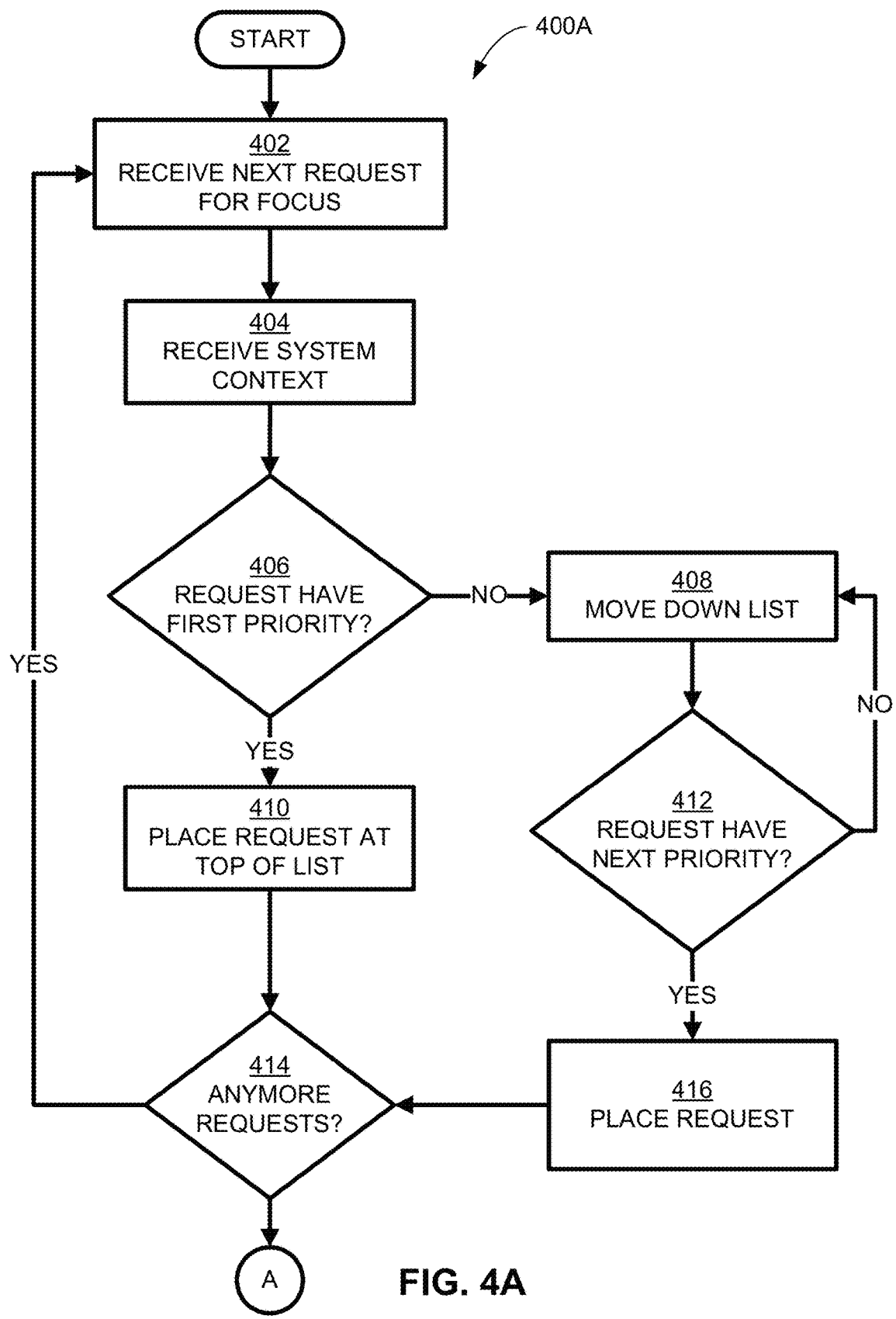
FIG. 4A depicts an example method for displaying an application in a window in a graphical user interface environment on a computer system, consistent with embodiments of the present disclosure.

FIG. 4A depicts a method 400A for displaying an application in a window in a graphical user interface environment on a computer system, consistent with embodiments of the present disclosure. In operation 402, a request for focus for an application may be received. The application request for focus may come from a number of sources. For instance, a user may make an application request for focus using an I/O device 212 such as a computer mouse, i.e., computer mouse 124, a keyboard, i.e., keyboard 126, a touch screen (not shown), etc. Also, an application, i.e., application 112, may make an application request for focus for another application, i.e., application 114. In yet another embodiment, an O/S, i.e., O/S 106, may make an application request for focus for an application, i.e., application 112. In addition, an application request for focus may be made at several different times. For instance, an O/S, i.e., O/S 106, may make an application request for focus for an application, i.e., application 112, during the start-up of a computer system, i.e., computing system 100. In another embodiment, a user may make an application request for focus for an application, i.e., application 112, periodically throughout the day.

In operation 404, the system context of the application request for focus may be received. The system context may comprise application context and user context. Application context may refer to the importance of the application. Importance may be determined from metadata tags attached to the applications that have been requested for focus. The metadata tags may describe the content of the applications and the content of one application may be more important than the content of another application. User context may pertain to the status of a user. Possible states of the user may be the user is looking down at the keyboard, i.e., keyboard 126, and not at the monitor, i.e., monitor 122, headphones are plugged into the client system, i.e., client system 102, user is touching the computer mouse, i.e., computer mouse 124, etc.

In operation 406, the method 400A may determine which application request for focus has a first display priority. The system context comprising the application context and the user context, in concert with the preferences, may be used to assign priority. Preferences may be manually configured or learned. Furthermore, a computing system, i.e., computing system 100, may have default preferences based on pre-configured rules. Preferences may be encoded as a set of key-value pairs or rules. If the application has first display priority, in operation 410, the application may be placed at the top of the priority list and the method 400A may proceed to operation 414. In operation 414, the method 400A may determine whether there are any more application requests for focus. If there are, in operation 402, the next request for focus may be received.

Illustratively, if the method 400A determines, in operation 406, that the first application request for focus does not have first display priority, in operation 408, the method 400A may move down to the next application on the priority list. In operation 412, the method 400A may determine if the application has second display priority. If the application has second (i.e., next) display priority then, in operation 416, the application is placed second on the priority list. The method 400A may then determine, in operation 414, whether there are any more application requests for focus. If, in operation 412, the method 400A determines that the application does not have second display priority then, in operation 408, the method 400A may move down the priority list to determine if the application has third display priority.

Figure 4B:
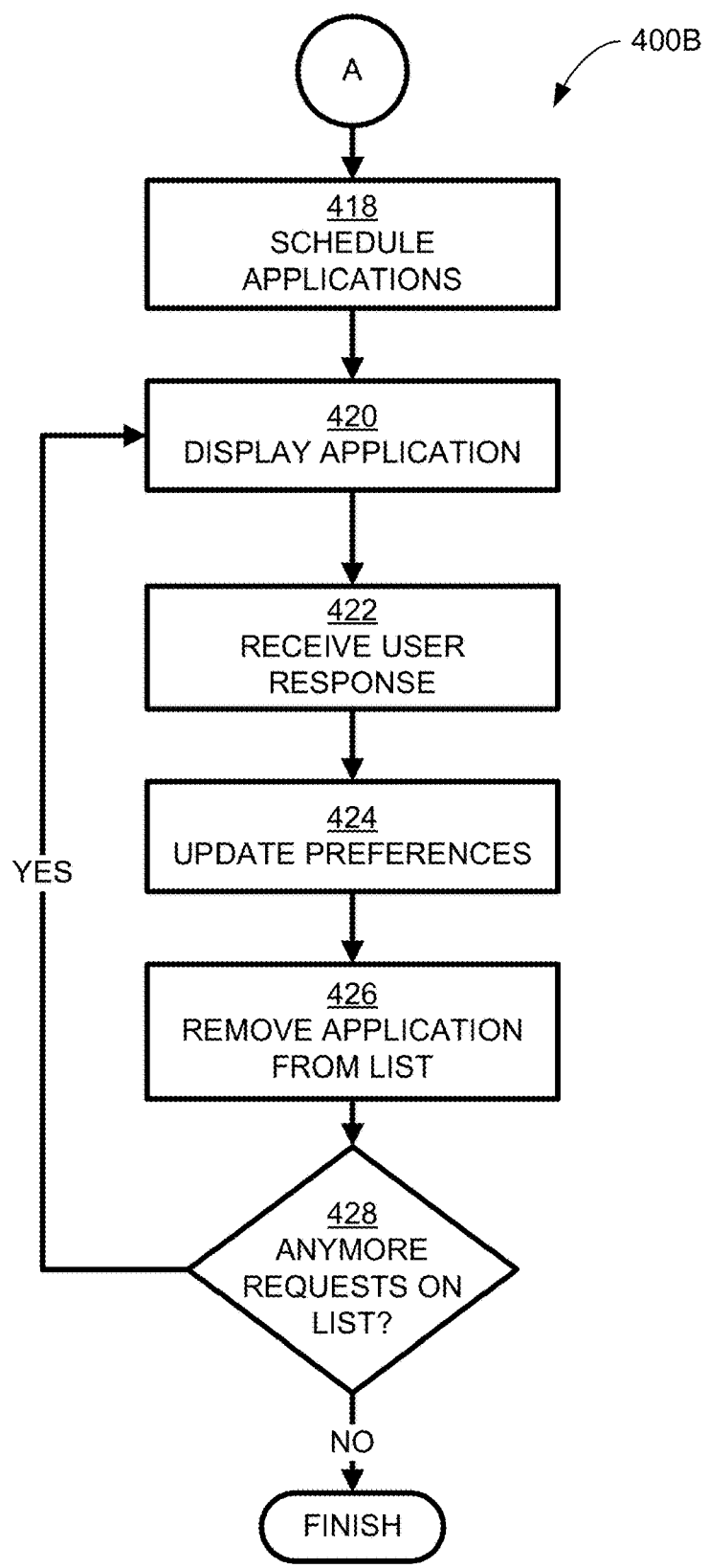
FIG. 4B depicts a continuation of the example method for displaying an application in a window in a graphical user interface environment on a computer system depicted in FIG. 4A, consistent with embodiments of the present disclosure.

FIG. 4B depicts a method 400B of a continuation of 400A for displaying an application in a window in a graphical user interface environment on a computer system, consistent with embodiments of the present disclosure. In operation 418, the method 400B may schedule the application or applications to be displayed. In operation 420, the application may be displayed to a user via a monitor, i.e., monitor 122. In operation 422 the method 400B may receive the response of the user when the application is displayed. A computer system, i.e., computer system 100, may have a learner tool, i.e., learner 212, that may receive the response of a user to the display of an application from interaction between the user and I/O devices, i.e., monitor 122, computer mouse 124, and keyboard 126. In operation 424, the method 400B may then generate a set of updates to the preferences.

In operation 426, after the application is displayed, the method 400B may remove the application from the priority list. In operation 428, the method 400B may determine whether there are any more applications on the priority list to display. If there are, in operation 420, the application at the top of the priority list may be displayed. If no applications remain, then the method terminates.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure.

Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

What is claimed is:

1. A method for displaying windows associated with applications in a graphical user interface (GUI) included on a computer system, the method comprising:

receiving, from a first application, a first request for a first window associated with the first application to have focus in the GUI such that upon having focus the first window would receive input from input devices controlled by a user of the GUI, the GUI currently displaying and having focus on a second window associated with a second application;

receiving, from the input devices, a user context about activity of the user in relation to the computer system;

receiving, from the first application, metadata that describes the first application;

determining, from the received metadata, the application context of the first application;

determining, based on the received user context and the application context, a first display priority;

creating, based on the determined first display priority, a list of one or more applications including the first application and the second application;

wherein the list of one or more applications comprises the first application having priority over the second application;

stealing, from the second window and based on the list of one or more applications, focus to the first window in the GUI;

providing a singular priority request dialog to the user in the GUI, the singular priority request dialog including information describing the first window and the second window, and wherein the singular priority request dialog relates to a subsequent display of the first window or the second window;

receiving, from the user, a priority response to the priority request dialog;

wherein the received priority response indicated not to focus on the first window;

determining a second display priority based on the received priority response; and updating the list of the one or more applications based on the second display priority;

wherein the updated list comprises the second application having priority over the first application based on the second display priority;

wherein the GUI currently displaying and having focus on the second window;

receive, from the first application, a subsequent request for the first window to have focus in the GUI from the second window; and denying, based on the second display priority, the subsequent request.

2. The method of claim 1, wherein the received priority response indicated not to focus on the first window, and wherein the GUI currently displaying and having focus on the second window, the computer readable program code further configured to:

receiving, from the first application, a second request for the first window associated with the first application to have focus in the GUI;

determining, based on the application context and based on the list of the one or more applications, a third display priority; and denying, based on the third display priority, the second request.

3. A method for displaying windows associated with applications in a graphical user interface (GUI) included on a computer system, the method comprising:

receiving, from a first application, a first request for a first window associated with the first application to have focus in the GUI such that upon having focus the first window would receive input from input devices controlled by a user of the GUI, the GUI currently displaying and having focus on a second window associated with a second application;

receiving, from the input devices, a user context about activity of the user in relation to the computer system;

receiving, from the first application, metadata that describes the first application;

determining, from the received metadata, the application context of the first application;

determining, based on the application context, a first display priority, wherein the display priority includes a confidence of a preference encoded for stealing of focus between applications;

creating, based on the determined first display priority, a list of one or more applications including the first application and the second application;

wherein the list of one or more applications comprises the first application having priority over the second application;

stealing, from the second window and based on the list of one or more applications, focus to the first window in the GUI;

providing a priority request dialog to the user in the GUI, the priority request dialog related to the display of the first window and the second window;

receiving, from the user, a priority response to the priority request dialog;

wherein the received priority response indicated not to focus on the first window;

determining a second display priority based on the received priority response; and updating the list of the one or more applications based on the second display priority;

wherein the updated list comprises the second application having priority over the first application based on the second display priority;

wherein the GUI currently displaying and having focus on the second window;

receive, from the first application, a subsequent request for the first window to have focus in the GUI from the second window; and denying, based on the second display priority, the subsequent request.

* * * * *